(12) United States Patent
You et al.

(10) Patent No.: US 9,689,048 B2
(45) Date of Patent: Jun. 27, 2017

(54) CONTINUOUS TEMPERATURE MEASURING DEVICE AND RH APPARATUS INCLUDING THE SAME

(71) Applicants: WOOJIN Electro-Nite Inc., Pyeongtaek-si, Gyeonggi-do (KR); Heraeus Electro-Nite International N.V., Houthalen (BE)

(72) Inventors: Jong-An You, Yongin-si (KR); Kwang-Sun Park, Gwangyang-si (KR); Yeong-In Kim, Pyeongtaek-si (KR)

(73) Assignees: WOOJIN Electro-Nite Inc., Pyeongtaek-si, Gyeonggi-do (KR); Heraeus Electro-Nite International N.V., Houthalen (BE)

( * ) Notice: Subject to any disclaimer, the term of this patent is extended or adjusted under 35 U.S.C. 154(b) by 0 days.

(21) Appl. No.: 15/039,494

(22) PCT Filed: Nov. 24, 2014

(86) PCT No.: PCT/KR2014/011308
§ 371 (c)(1),
(2) Date: May 26, 2016

(87) PCT Pub. No.: WO2015/080443
PCT Pub. Date: Jun. 4, 2015

(65) Prior Publication Data
US 2016/0376671 A1    Dec. 29, 2016

(30) Foreign Application Priority Data
Nov. 27, 2013    (KR) .................. 10-2013-0145610

(51) Int. Cl.
*F27D 11/08*    (2006.01)
*C21C 5/46*    (2006.01)
(Continued)

(52) U.S. Cl.
CPC .............. *C21C 5/4673* (2013.01); *C21C 7/10* (2013.01); *F27D 21/0014* (2013.01); *G01J 5/02* (2013.01);
(Continued)

(58) Field of Classification Search
CPC ........................... F27D 21/0014; F27D 11/08
(Continued)

(56) References Cited

U.S. PATENT DOCUMENTS

| 6,190,037 B1 | 2/2001 | Das et al. |
| 6,227,702 B1 | 5/2001 | Yamada et al. |

(Continued)

FOREIGN PATENT DOCUMENTS

| CN | 1174986 A | 3/1998 |
| CN | 1210256 A | 3/1999 |

(Continued)

OTHER PUBLICATIONS

Machine English Language translation of KR 10-2011-0141650 Jul. 2013.*

(Continued)

*Primary Examiner* — Scott Kastler
(74) *Attorney, Agent, or Firm* — Panitch Schwarze Belisario & Nadel LLP

(57) ABSTRACT

A Ruhrstahl-Heraeus (RH) apparatus for performing a vacuum degassing process of molten metal includes a sensor hole formed at a lower vessel of a vacuum vessel; a continuous temperature measuring device mounted on the sensor hole and including a light-to-temperature converter measuring temperature based on received light, a light guide rod receiving light from a measurement target, an optical fiber transferring the light received by the light guide rod to the light-to-temperature converter, a connector connecting the optical fiber to the light guide rod while maintaining (Continued)

straightness of the optical fiber, a primary protection tube enclosing an outer peripheral surface of the light guide rod, a flexible heat resistant tube protecting the optical fiber, and a joint connected to the flexible heat resistant tube and provided with a cooling gas injection tube; and a cooling gas supply unit supplying cooling gas to the cooling gas injection tube.

13 Claims, 3 Drawing Sheets

(51) Int. Cl.
    *C21C 7/10*     (2006.01)
    *G01J 5/02*     (2006.01)
    *G01J 5/28*     (2006.01)
    *G01K 11/00*     (2006.01)
    *F27D 21/00*     (2006.01)
    *G01K 7/02*     (2006.01)
    *G01K 11/32*     (2006.01)

(52) U.S. Cl.
    CPC .................. *G01J 5/28* (2013.01); *G01K 7/02* (2013.01); *G01K 11/00* (2013.01); *G01K 11/32* (2013.01)

(58) Field of Classification Search
    USPC ........................................................ 266/100
    See application file for complete search history.

(56) References Cited

U.S. PATENT DOCUMENTS

| | | | |
|---|---|---|---|
| 6,235,084 B1 | 5/2001 | Scholer et al. | |
| 6,862,549 B1 | 3/2005 | Palfenier et al. | |
| 7,635,220 B2 | 12/2009 | Dams et al. | |
| 7,712,957 B2 | 5/2010 | Kendall | |
| 2007/0268477 A1 | 11/2007 | Dams et al. | |

FOREIGN PATENT DOCUMENTS

| | | | |
|---|---|---|---|
| JP | S5735736 A | 2/1982 | |
| JP | H09257580 A | 10/1997 | |
| JP | 2000500528 A | 1/2000 | |
| JP | 2001091362 A | 4/2001 | |
| JP | 2005509881 A | 4/2005 | |
| JP | 2008545975 A | 12/2008 | |
| KR | 20000058099 A | 9/2000 | |
| KR | 100816634 B1 | 3/2008 | |
| KR | 10-2011-0141650 | * | 7/2013 |
| WO | 9914565 A1 | 3/1999 | |
| WO | 03044475 A1 | 5/2003 | |
| WO | 2006130941 A1 | 12/2006 | |
| WO | 2007037771 A1 | 4/2007 | |

OTHER PUBLICATIONS

English translation of International Search Report and Written Opinion issued Feb. 2, 2015 in International Application No. PCT/KR2014/011308.

Office Action issued Feb. 22, 2016 in TW Application No. 103141257.

Search Report issued Feb. 18, 2016 in TW Application No. 103141257.

Notice of Allowance issued Sep. 30, 2014 in KR Application No. 10-2013-0145610.

Office Action issued Apr. 6, 2017 in JP Application No. 2016-534723.

* cited by examiner

CONTINUOUS TEMPERATURE MEASURING DEVICE AND RH APPARATUS INCLUDING THE SAME

CROSS-REFERENCE TO RELATED APPLICATIONS

This application is a Section 371 of International Application No. PCT/KR2014/011308, filed Nov. 24 2014, which was published in the English language on Jun. 4, 2015, under International Publication No. WO 2015/080443 A1 and the disclosure of which is incorporated herein by reference.

BACKGROUND OF THE INVENTION

The present invention relates to a continuous temperature sensor used in a Ruhrstahl-Heraeus (RH) process of mainly performing vacuum degassing in steelworks, and an RH apparatus including the same.

Vacuum level and temperature within a vacuum vessel and additives are important control factors for an RH apparatus that performs a vacuum degassing process.

Although various information for continuous measurement and control of temperature can be obtained through a temperature sensor or a composite sensor using a thermocouple in a batch, the temperature sensor or composite sensor is limited in the continuous provision of information regarding molten steel.

Referring to U.S. Pat. No. 6,235,084 (issued on May 22, 2001), the temperature of an RH apparatus is generally measured with a temperature measurement element-thermocouple using a lance on an upper surface of a ladle exposed to the atmosphere. In this case, however, since temperature measurement is performed using a disposable sensor, the temperature is intermittently measured, thereby making it difficult to achieve continuous temperature management.

Korean Patent No. 10-0816634 (issued on Mar. 18, 2008) discloses a method of measuring temperature for a long period of time by arranging a thermocouple within a protective body. However, this method requires an expensive platinum thermocouple which has a long length like a sensor and, thus, costs are incurred due to a high-priced protection tube and thermal equilibrium takes a long duration when the thermocouple is dipped in a melt to be measured, thereby causing undesirable response performance. Also, degradation rapidly progresses due to characteristics of the vacuum degassing process, in which dipping and recovery of the thermocouple are repeated, thereby making it difficult to use the thermocouple for a long period of time.

U.S. Patent Application Publication No. 2007-0268477 (published on Nov. 22, 2007) discloses a method in which continuous temperature measurement can be performed by dipping an optical fiber in molten metal, while correcting an error of a measurement instrument due to radiant heat. The optical fiber directly contacts the interior of the molten steel while avoiding slag floating on the molten metal, thereby enabling temperature measurement of the molten metal. In this method, since the dipped optical fiber can be lost, continuous dipping of the optical fiber is performed through a feeder supplying optical fibers. Further, this method can suffer from problems caused by heat radiation.

An objective of the present invention is to provide a continuous temperature measuring device which can continuously measure temperature at low cost and can effectively measure the temperature of molten steel in an RH apparatus, and an RH apparatus including the same.

BRIEF SUMMARY OF THE INVENTION

In accordance with one aspect of the present invention, a continuous temperature measuring device includes a light-to-temperature converter measuring temperature based on received light; a light guide rod receiving light from a measurement target; an optical fiber transferring the light received by the light guide rod to the light-to-temperature converter; a connector connecting the optical fiber to the light guide rod while maintaining straightness of the optical fiber; a primary protection tube enclosing an outer peripheral surface of the light guide rod; and a flexible heat resistant tube protecting the optical fiber.

Preferably, the continuous temperature measuring device further comprises a secondary protection tube enclosing an outer peripheral surface of the primary protection tube and forming a cooling gas channel between the primary and secondary protection tubes; and a joint connected to the flexible heat resistant tube and provided with a cooling gas injection tube. It can be advantageous that the cooling gas injection tube is inclined at an obtuse angle with respect to a direction toward the light guide rod. The continuous temperature measuring device may further comprise a securing member connected between the primary and secondary protection tubes so as to maintain straightness of the primary and secondary protection tubes, and may have a communication recess through which a cooling gas flows.

It is further preferred that the light guide rod is provided with a protrusion and the primary protection tube is provided with a stopper for stopping the protrusion, such that the light guide rod is not separated from the primary protection tube. The primary protection tube can be divided into two coupling sections, such that each side of the protrusion abuts each protection tube section when coupled, forming the stopper.

The continuous temperature measuring device may further comprise a thermocouple having a temperature measuring junction formed on the connector. A temperature increase may result in an error. The thermocouple can be used to correct for this error.

In accordance with another aspect of the present invention, an RH apparatus for performing a vacuum degassing process of molten metal includes a sensor hole formed at a lower vessel of a vacuum vessel; a continuous temperature measuring device mounted on the sensor hole and including a light-to-temperature converter measuring temperature based on received light, a light guide rod receiving light from a measurement target, an optical fiber transferring the light received by the light guide rod to the light-to-temperature converter, a connector connecting the optical fiber to the light guide rod while maintaining straightness of the optical fiber, a primary protection tube enclosing an outer peripheral surface of the light guide rod, a flexible heat resistant tube protecting the optical fiber, and a joint connected to the flexible heat resistant tube and provided with a cooling gas injection tube; and a cooling gas supply unit supplying cooling gas to the cooling gas injection tube.

The RH apparatus preferably comprises a flange tube extending from the sensor hole and an external flange tube enclosing an outer peripheral surface of the primary protection tube, forming a cooling gas channel between the primary protection tube and the external flange tube, and coupled to the flange tube, wherein the cooling gas is supplied between the flange tube and the outer flange tube.

Further, it can be advantageous that the RH apparatus further comprises a heat shield plate for shielding radiant heat below the flange tube and the outer flange tube.

It is further preferred that the sensor hole is formed to measure temperature in an area between a riser tube and a downcomer tube. The sensor hole can be formed at a height of 100 mm to 300 mm from a bottom of the lower vessel.

A light reception end of the light guide rod can be placed within a distance of 100 mm to 200 mm from a refractory material.

According to the embodiments of the present invention, the continuous temperature measuring device can continuously measure the temperature of molten metal and can be used not once but continuously for a long period of time.

Further, the RH apparatus makes it possible to continuously and stably identify the temperature of the molten metal, thereby achieving effective process management.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
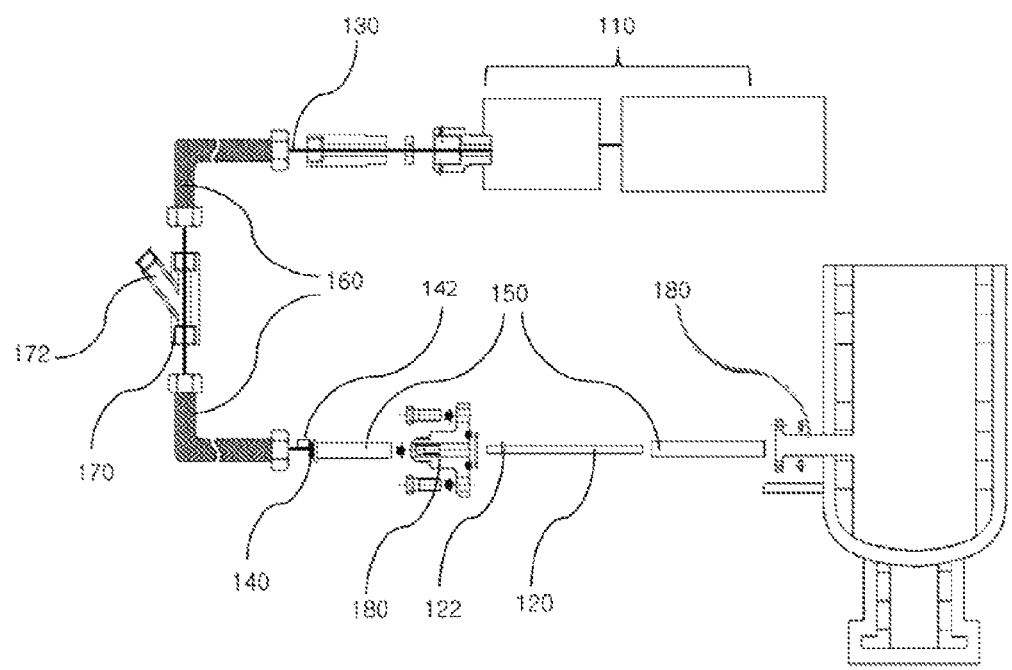
FIG. 1 is a diagram of a continuous temperature measuring device according to one embodiment of the present invention.

Terms used in the following description and claims should be interpreted as having a meaning that is consistent with their meaning in the context of the specification and relevant art and should not be interpreted in an idealized or overly formal sense as defined in commonly used dictionaries. In addition, the disclosure in the specification and the configurations shown in the drawings are just exemplary embodiments of the present invention and do not cover all the technical idea of the present invention. Thus, it should be understood that such embodiments may be replaced by various equivalents and modifications at the time point when the present application is filed.

The present invention relates to a continuous temperature measuring device that can continuously measure temperature of a high temperature measurement target such as molten metal, and generally relates to a continuous temperature measuring device that can be used in a Ruhrstahl Heraeus (RH) apparatus.

FIG. 1 is a diagram of a continuous temperature measuring device according to one embodiment of the present invention.

Referring to FIG. 1, a continuous temperature measuring device according to one embodiment of the present invention includes a light-to-temperature converter 110 that measures temperature based on received light, a light guide rod 120 that receives light from a measurement target, an optical fiber 130 that transfers the light received by the light guide rod 120 to the light-to-temperature converter, a connector 140 through which the optical fiber 130 is connected to the light guide rod 120 while being maintained in a straight state, a primary protection tube 150 that encloses an outer peripheral surface of the light guide rod 120, and a flexible heat resistant tube 160 that protects the optical fiber.

The light-to-temperature converter 110 may include a radiation pyrometer that receives light to thereby generate an electrical signal and a display that displays a measured temperature.

The continuous temperature measuring device according to the present invention measures a temperature through an optical method. However, since slag floats in a ladle, it is difficult to measure temperature from above the ladle in the optical method. The method of measuring temperature through direct contact of the optical fiber with molten metal to receive light is disclosed in U.S. Patent Application Publication No. 2007-0268477 presented in the Background of the Invention section, in which the optical fiber is dipped in the molten metal and thus consumed, thereby causing an increase in costs.

However, since molten steel is exposed to an interior of a vacuum vessel upon heat treatment by pressure reduction, as in a vacuum degassing process, the present invention can remove an unnecessary process, such as continuous dipping of the optical fiber, by receiving light from the molten steel exposed to the pressure reduced atmosphere.

Further, since the optical fiber has weak mechanical properties despite excellent flexibility, it is advantageous in terms of installation or high temperature durability that the optical fiber is connected to the vacuum vessel of a measurement side through a separate member for light reception while being directly connected to the light-to-temperature converter.

The present invention provides a structure facilitating light reception within the vacuum vessel using the light guide rod and the optical fiber having excellent light transmittance.

According to the present invention, the light guide rod 120 is provided with a protrusion 122 protruding from an outer peripheral surface thereof, and the primary protection tube 150 is provided with a stopper 123 for stopping the protrusion 122, such that the light guide rod 120 is not separated from the primary protection tube 150. The light guide rod 120 serves to guide light and may be formed of a transparent material that does not deform at high temperature. For example, the light guide rod 120 may be formed of quartz, sapphire, heat-resistant glass, transparent synthetic resin, or the like.

Although various means such as clamp fixing, adhesives, and the like have been employed for securing the light guide rod 120, the protrusion 122 is formed on a smooth surface of the light guide rod 120 and the stopper 123 for stopping the protrusion 122 is provided to the primary protection tube 150, thereby providing a desirable structure for leakage prevention.

As shown in FIG. 1, for configuration of the primary protection tube 150 having such a structure, the primary protection tube 150 may be formed with a structure in which the primary protection tube 150 is divided into left and right sections, which are coupled to each other, with the stopper 122 placed at the center there between.

Since large vibration can be generated from the light guide rod 120 due to pressure reduction or blowing of molten steel in use conditions of the RH apparatus, the primary protection tube 150 encloses the outer peripheral surface of the light guide rod 120 to protect the light guide rod 120, thereby reinforcing the light guide rod 120.

Although problems due to pressure differences according to pressure reduction can be encountered during temperature measurement in the vacuum vessel, such as the RH apparatus, such problems can be solved by continuously introducing cooling gas from outside.

To this end, the continuous temperature measuring device according to the present invention may include a joint 170 connected to the flexible heat resistant tube and provided with a cooling gas injection tube 172.

Further, the cooling gas injection tube 172 may be inclined at an obtuse angle with respect to a direction toward the light guide rod 120, such that the joint 170 may introduce cooling gas in the direction toward the light guide rod 120. Namely, the cooling gas injection tube 172 is configured to allow the introduced cooling gas to flow smoothly in the direction toward the light guide rod 120 and not toward the light-to-temperature converter 110, thereby supplying the cooling gas without pressure drop.

In addition, such a cooling gas supply structure using the joint 170 may prevent high temperature molten steel from directly damaging or deforming the light guide rod 120 due to a room temperature or low temperature cooling gas.

The primary protection tube 150 may be inserted into a secondary protection tube 180, such that the cooling gas may flow into a space between the primary and secondary protection tubes 150, 180. Namely, an outer surface of the primary protection tube 150 and an inner surface of the secondary protection tube 180 are separated from each other by a predetermined distance, such that the cooling gas can flow into the space there between.

To this end, the continuous temperature measuring device may further include a securing member 190 connecting the primary and secondary protection tubes 150, 180, so as to maintain the straightness of the primary and secondary protection tubes 150, 180, and having a communication recess through which the cooling gas flows.

As described above, the primary protection tube 150 serves to protect the light guide rod 120 so as to prevent damage of the light guide rod 120 due to vibration. However, since the primary protection tube 150 is disposed within the secondary protection tube 180 such that a cooling gas channel is formed between the primary and secondary protection tubes 150, 180, the securing member 190 capable of tightly securing the primary protection tube 150 to the secondary protection tube 180 is required.

Figure 2:
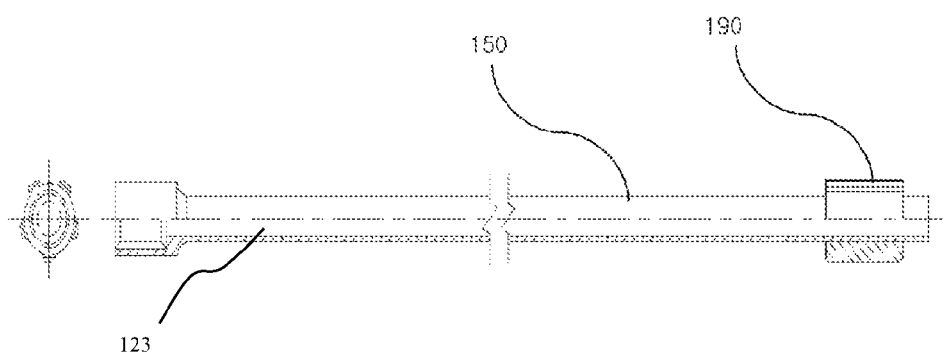
FIG. 2 is a sectional view of a securing member attached to a primary protection tube of the continuous temperature measuring device according to an embodiment of the present invention.
Figure 3:
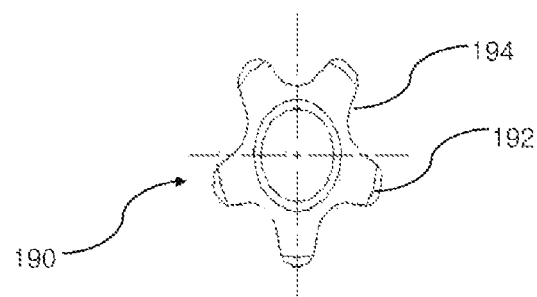
FIG. 3 is a front view of the securing member of the continuous temperature measuring device according to an embodiment of the present invention.

FIG. 2 shows a state where the securing member 190 is attached to the primary protection tube 150, and FIG. 3 is a front view of the securing member 190.

The securing member 190 connects the primary protection tube 150 to the secondary protection tube 180. As shown in FIG. 3, an inner peripheral surface of the securing member 190 is attached to the primary protection tube 150, and an outer peripheral surface of the securing member 190 may be composed of contact surfaces 192 attached to the inner surface of the secondary protection tube 180 and non-contact surfaces 194 separated from the inner surface of the secondary protection tube 180.

The inner peripheral surface of the securing member 190 may also be composed of contact surfaces attached to the outer peripheral surface of the primary protection tube 150 and non-contact surfaces not attached to the outer peripheral surface of the primary protection tube 150. Alternatively, the securing member 190 may also be configured in a shape in which the inner peripheral surface thereof is attached to the primary protection tube 150, the outer peripheral surface thereof is attached to the secondary protection tube 180, and through-holes through which the cooling gas flows are formed therethrough.

Referring back to FIG. 1, the continuous temperature measuring device includes the connector 140, which connects the light guide rod 120 to the optical fiber 130 and serves to maintain the straightness of the optical fiber 130 having no stiffness.

An FC connector may be used as the connector 140. The FC connector may be formed by filling of an epoxy resin, and deviation of measured temperature may be generated due to light reception when the epoxy resin generally used at a temperature of 150 degrees Celsius is exposed to a high temperature environment.

Thus, a separate thermocouple 142 may be attached to the connector 140. A temperature increase may result in an error. The thermocouple can be used to correct for this error.

In more detail, a temperature measuring junction of the thermocouple is formed on the connector, and a thermocouple measurement device is additionally provided to the light-to-temperature converter 110 by extending a compensating lead wire into the flexible heat resistant tube 160, thereby making it possible to monitor temperature increase of the connector 140 and cope with change in a temperature measurement environment.

Next, an RH apparatus including the aforementioned continuous temperature measuring device will be described.

Figure 4:
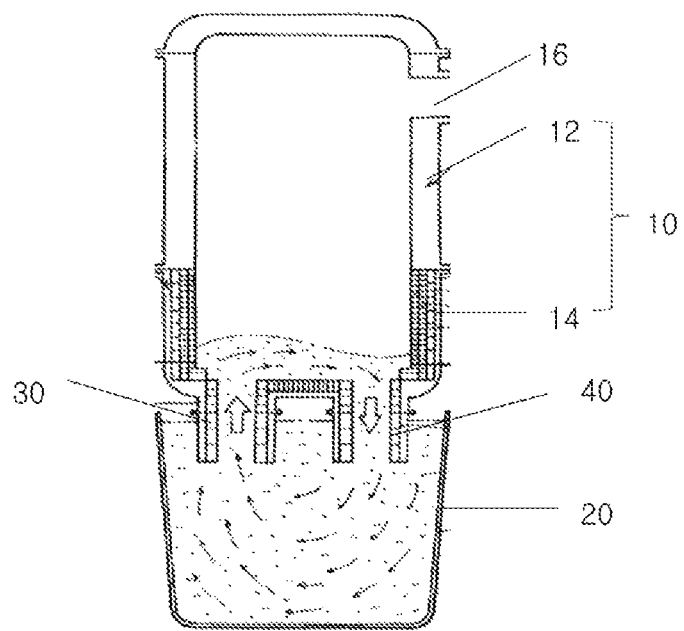
FIG. 4 is a schematic view of a general RH apparatus.

FIG. 4 is a schematic view of a general RH apparatus.

Since molten iron prepared by melting iron ore in a blast furnace has a high carbon content, carbon in the molten iron is removed to a predetermined content (about 0.04%) by dipping the molten iron in a converter and bubbling with pure oxygen gas in the steel making process. The molten iron, the carbon content of which is reduced to a predetermined level, is referred to as molten steel.

After the converter process, the molten steel is fed into the RH apparatus. In the RH apparatus, the molten steel is intensely stirred under vacuum such that the components and temperature of the molten steel become uniform and the remaining gas components are removed from the molten steel. Thereafter, the molten steel is fed into a continuous casting process.

The RH apparatus for performing a vacuum degassing process includes a vacuum vessel 10 including an upper vessel 12 and a lower vessel 14, a ladle 20 placed below the vacuum vessel 10 and storing molten steel, a riser tube 30 through which the molten steel stored in the ladle 20 is suctioned into the vacuum vessel 10 by reduced pressure within the vacuum vessel, and a downcomer tube 40 through which the molten steel within the vacuum vessel is discharged into the ladle 20.

An exhaust port 16 to which an exhaust pump is connected is formed in the vacuum vessel 10.

The RH apparatus circulates the molten steel through the two circulation tubes including the riser tube 30 through which the molten steel stored in the ladle 20 is suctioned into the vacuum vessel 10 by reduced pressure within the vacuum vessel 10 and the downcomer tube 40 through which the molten steel within the vacuum vessel is discharged into the ladle 20. The RH apparatus blows argon gas through a nozzle provided to the riser tube 30 to decrease apparent specific gravity of the molten steel, thereby causing a height difference of the molten steel within the vacuum vessel 10, and decreases partial pressure of gas-phase molecules within the molten steel in a pressure reduced atmosphere to thereby perform the degassing process.

Figure 5:
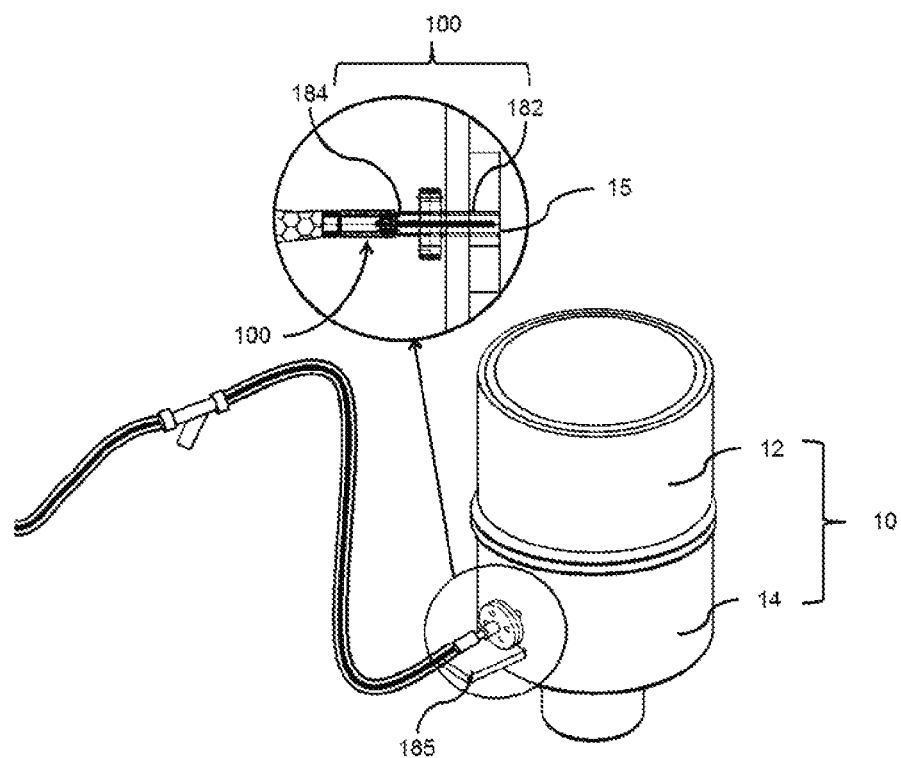
FIG. 5 is a schematic view of an RH apparatus according to one embodiment of the present invention.
Figure 6:
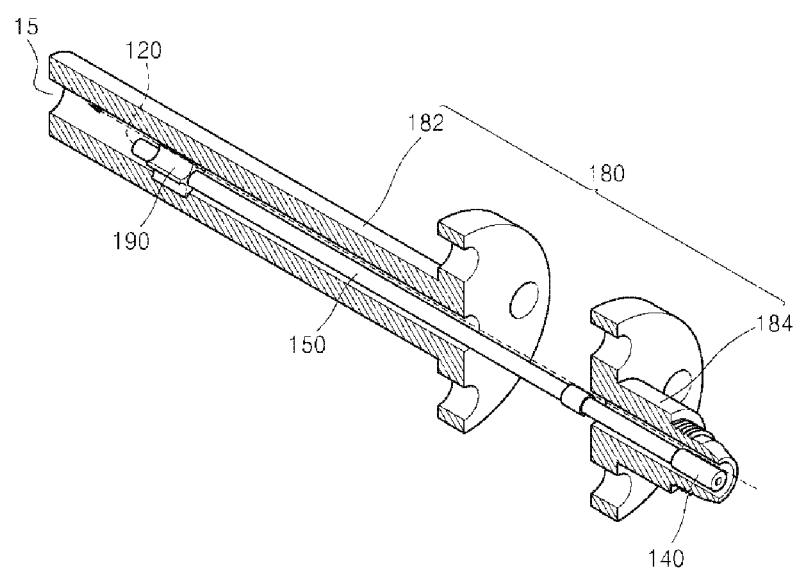
FIG. 6 is a view of an internal structure of a secondary protection tube in the RH apparatus according to an embodiment of the present invention.

FIG. 5 is a schematic view of an RH apparatus according to one embodiment of the present invention, and FIG. 6 is a view of an internal structure of a secondary protection tube in the RH apparatus of the embodiment of FIG. 5.

The RH apparatus according to the embodiment of FIG. 5 includes a sensor hole 15 formed at a lower vessel 14 of a vacuum vessel 10; a continuous temperature measuring device 100 mounted on the sensor hole and including a light-to-temperature converter that measures temperature based on received light, a light guide rod 120 (located inside a primary protection tube in FIG. 6) that receives light from a measurement target, an optical fiber that transfers the light received by the light guide rod 120 to the light-to-temperature converter, a connector 140 connecting the optical fiber to the light guide rod 120 so as to maintain straightness of the optical fiber, a primary protection tube 150 that encloses an outer peripheral surface of the light guide rod 120, a flexible heat resistant tube that protects the optical fiber, and a joint connected to the flexible heat resistant tube and provided with a cooling gas injection tube; and a cooling gas supply unit (not shown) that supplies cooling gas to the cooling gas injection tube.

The RH apparatus according to an embodiment of the present invention further includes a secondary protection tube 180 including a flange tube 182 extending from the sensor hole and an external flange tube 184 that encloses an outer peripheral surface of the primary protection tube 150, forms a cooling gas channel between the primary protection tube 150 and the external flange tube 184, and coupled to the flange tube.

Further, the primary protection tube 150 is secured to an interior of the secondary protection tube 180 through a securing member 190. The securing member 190 is provided with a communication recess through which the cooling gas (shown by a dotted line in FIG. 6) may flow.

The RH apparatus according to an embodiment of the present invention may further include a heat shield plate 185, shielding radiant heat, below the flange tube 182 and the external flange tube 184.

Since the continuous temperature measuring device mounted on the sensor hole is exposed to high temperature molten steel and slag in the ladle, the heat shield plate 185 for shielding the radiant heat may be disposed below the flange tube 182 and the external flange tube 184, thereby preventing overheating of the continuous temperature measuring device.

The sensor hole 15 may be formed such that temperature in an area between the riser and downcomer tubes may be measured. Further, the sensor hole 15 may be formed at a height of 100 mm to 300 mm from a bottom of the lower vessel 14.

In the case where the sensor hole 15 is formed at a height less than 100 mm from the bottom of the lower vessel 14, the molten steel descends into the ladle after being completely processed, and skulls falling from upper and inner sides of the vacuum vessel may be stacked at a lower portion of the vacuum vessel, in which pressure has been restored. At this time, some of the skulls stacked at the lower portion of the vacuum vessel are welded on the sensor hole 15 or close the sensor hole 15 to block out light, thereby causing problems in subsequent use of the ladle.

On the other hand, in the case where the sensor hole 15 is formed at a height greater than 300 mm from the bottom of the lower vessel 14, the molten steel does not reach the sensor hole while being processed, thereby causing the molten steel to be inaccurately received.

Another important factor in the arrangement of the sensor hole 15 is a correlation between the sensor hole 15 and dip tubes. A carrier gas is used to suction the molten steel in the two dip tubes including the riser and downcomer tubes which are alternately used, and melting loss of a refractory material around the dip tubes becomes serious due to the carrier gas and suctioning of the molten steel. However, since the continuous temperature measuring device according to the present invention is mounted inside the refractory material of the lower vessel, melting loss of the refractory material may lead to exposure of the light guide rod, which can cause deviation of measured temperatures due to deformation of the light guide rod at high temperature. Accordingly, the sensor hole may be disposed in the area between the riser tube and the downcomer tube.

When the continuous temperature measuring device 100 is mounted inside the refractory material, it is desirable that a light reception end of the light guide rod be placed within a distance of 100 mm to 200 mm from the refractory material. However, when the light reception end of the light guide rod is placed too close to the molten steel, as the refractory material of the vacuum vessel erodes, a quartz bar can be directly exposed to the molten steel, thereby causing measurement deviation due to high temperature deformation. On the other hand, when the light reception end of the light guide rod is placed too deep in the lower vessel, the light guide rod cannot receive light from the molten steel.

In the RH apparatus according to the present invention, light radiating from the molten steel is transferred to the light-to-temperature converter through the light guide rod and the optical fiber within the flexible heat resistant tube and is read as a temperature value in the light-to-temperature converter. The cooling gas supplied from the cooling gas supply unit is introduced in a direction of a light source through the joint connected to a portion of the flexible heat resistant tube, passes between the primary and secondary protection tubes, and protects the light guide rod from the molten steel and the high temperature of the molten steel. Further, the protrusion formed on the light guide rod and the stopper installed in the primary protection tube may prevent the light guide rod from being suctioned into the vacuum vessel under reduced pressure.

Although some embodiments have been provided to illustrate the present invention, it will be apparent to those skilled in the art that the embodiments are given by way of illustration, and that various modifications and equivalent embodiments can be made without departing from the spirit and scope of the present invention. Accordingly, the scope of the present invention should be limited only by the accompanying claims and equivalents thereof.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A continuous temperature measuring device comprising:
   a light-to-temperature converter measuring temperature based on received light;
   a light guide rod receiving light from a measurement target;
   an optical fiber transferring the light received by the light guide rod to the light-to-temperature converter;
   a connector connecting the optical fiber to the light guide rod while maintaining straightness of the optical fiber;
   a primary protection tube enclosing an outer peripheral surface of the light guide rod; and
   a flexible heat resistant tube protecting the optical fiber.

2. The continuous temperature measuring device according to claim 1, further comprising:
   a secondary protection tube enclosing an outer peripheral surface of the primary protection tube and forming a cooling gas channel between the primary and secondary protection tubes; and
   a joint connected to the flexible heat resistant tube and provided with a cooling gas injection tube.

3. The continuous temperature measuring device according to claim 2, wherein the cooling gas injection tube is inclined at an obtuse angle with respect to a direction toward the light guide rod.

4. The continuous temperature measuring device according to claim 2, further comprising:
   a securing member connected between the primary and secondary protection tubes so as to maintain straightness of the primary and secondary protection tubes, and having a communication recess through which a cooling gas flows.

5. The continuous temperature measuring device according to claim 1, wherein the light guide rod is provided with a protrusion and the primary protection tube is provided with a stopper for stopping the protrusion such that the light guide rod is not separated from the primary protection tube.

6. The continuous temperature measuring device according to claim 5, wherein the primary protection tube is divided into two sections formed at both sides of the protrusion, the two sections being coupled to each other with the stopper placed at a center therebetween.

7. The continuous temperature measuring device according to claim 1, further comprising:
   a thermocouple having a temperature measuring junction formed on the connector.

8. A Ruhrstahl-Heraeus (RH) apparatus for performing a vacuum degassing process of molten metal, the RH apparatus comprising:
   a sensor hole formed at a lower vessel of a vacuum vessel;
   a continuous temperature measuring device mounted on the sensor hole, the continuous temperature measuring device comprising a light-to-temperature converter measuring temperature based on received light, a light guide rod receiving light from a measurement target, an optical fiber transferring the light received by the light guide rod to the light-to-temperature converter, a connector connecting the optical fiber to the light guide rod while maintaining straightness of the optical fiber, a primary protection tube enclosing an outer peripheral surface of the light guide rod, a flexible heat resistant tube protecting the optical fiber, and a joint connected to the flexible heat resistant tube and provided with a cooling gas injection tube; and
   a cooling gas supply unit supplying cooling gas to the cooling gas injection tube.

9. The RH apparatus according to claim 8, further comprising:
   a flange tube extending from the sensor hole; and
   an external flange tube enclosing an outer peripheral surface of the primary protection tube, forming a cooling gas channel between the primary protection tube and the external flange tube, and coupled to the flange tube,
   wherein the cooling gas is supplied between the flange tube and the outer flange tube.

10. The RH apparatus according to claim 9, further comprising:
    a heat shield plate for shielding radiant heat below the flange tube and the outer flange tube.

11. The RH apparatus according to claim 8, wherein the sensor hole is formed to measure temperature in an area between a riser tube and a downcomer tube.

12. The RH apparatus according to claim 8, wherein the sensor hole is formed at a height of 100 mm to 300 mm from a bottom of the lower vessel.

13. The RH apparatus according to claim 8, wherein a light reception end of the light guide rod is placed within a distance of 100 mm to 200 mm from a refractory material.

* * * * *